May 8, 1945.　　　　　D. GRANT　　　　　2,375,411
PRESSURE UNLOADING VALVE
Filed June 15, 1944
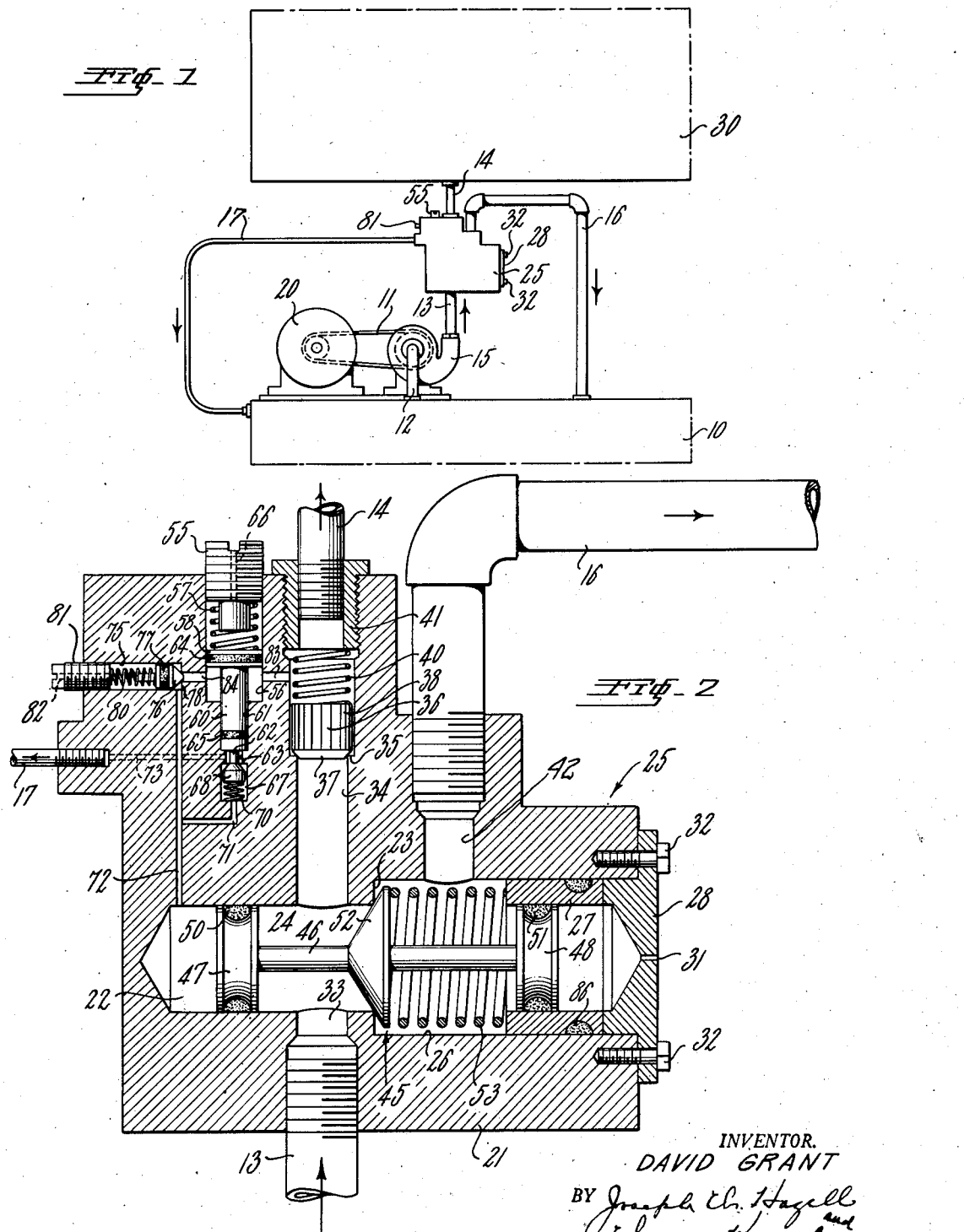
INVENTOR.
DAVID GRANT
BY
ATTORNEYS

UNITED STATES PATENT OFFICE 2,375,411

PRESSURE UNLOADING VALVE

David Grant, Dayton, Ohio

Application June 15, 1944, Serial No. 540,505

20 Claims. (Cl. 137—153)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a pressure unloading valve adapted to be interposed between a source of fluid under pressure and a receiver of such fluid.

It is among the objects of this invention to provide a pressure unloading valve of simplified construction; to provide a pressure unloading valve assembly including a main control valve which is balanced in all positions; to provide a pressure unloading valve assembly including a main control valve and means for preventing damage thereto due to too rapid seating; to provide a pressure unloading valve assembly including a "cut-out" pressure control valve having a seating area less than its body area; and to provide a pressure unloading valve which is efficient in operation and effectively sealed against fluid leakage.

These and other objects, advantages and capabilities of the invention will be more apparent from the following description and the accompanying drawing. In the drawing:

Fig. 1 is a diagrammatic representation of a fluid pressure control system embodying the valve of the preset invention.

Fig. 2 is a longitudinal sectional view through a pressure unloading valve embodying the present invention.

The valve of the present invention is adapted to be used in a fluid pressure or hydraulic system of the type in which a receiver or accumulator of fluid under pressure is charged from a suitable source or reservoir of fluid by pressure generating means such as a pump. The valve of the present invention is connected between the pump and the receiver or accumulator. Means are included in the valve assembly for automatically by-passing pressure fluid delivered by the pump back to the reservoir under low pressure when the pressure in the accumulator reaches or exceeds a preselected "cut-out" value thus unloading the pump, while at the same time maintaining pressure in the accumulator. When the receiver pressure drops below the "cut-in" pressure, the valve automatically operates to connect the pump to the receiver to recharge the receiver. The valve assembly includes a main control valve which is balanced in all positions in order to eliminate any effects of back pressure on the valve operation, and means are included in the assembly for preventing too rapid movement of the main control valve toward its seat to thereby prevent damage to the valve or its seat.

Referring to the drawing, Fig. 1 illustrates a fluid pressure system including a fluid reservoir 10, a pump 15 driven by a motor 20, a pressure unloading valve 25 and a pressure fluid receiver 30. Motor 20, when energized, drives pump 15 by suitable transmission means such as a belt or chain drive 11. Pump 15 withdraws fluid from reservoir 10 through a pipe or conduit 12 and forces such fluid through a pipe or conduit 13 into valve 25. When the pressure in receiver 30 is below the "cut-in" value, and "cut-out" value, valve 25 permits the pressure fluid to pass from the valve through a conduit 14 into receiver 30. When the pressure in receiver 30 equals or exceeds the "cut-out" value, valve 25 operates to automatically return fluid delivered to pipe 13 to reservoir 10 through a return pipe 16, while at the same time maintaining static pressure in receiver 30. For a purpose more fully described hereinafter, valve 25 is also connected by a drain pipe 17 to reservoir 10. The pressure in conduit 16 may be above atmospheric due to devices included in such return line and which have not been shown on the drawing in order to simplify the illutstration. However, the pressure in conduit 17 is equal to that in reservoir 10, which is normally atmospheric, but in some cases may be supercharged to a pressure somewhat higher.

Referring to Fig. 2, valve 25 includes a valve body 21 formed with a valve chamber 22. A shoulder 23 divides chamber 22 into chamber sections 24 and 26. Chamber 22 does not extend completely through body 21 so that it is closed at one end by body 21. Near the outer end of chamber section 26, a sleeve 27 having an internal diameter equal to the diameter of chamber section 24 is inserted in chamber 22 and held therein by a shouldered closure plate 28. Plate 28 is open to atmosphere through an aperture 31 and is secured to body 21 by suitable means such as studs 32. A suitable seal 86 is provided to prevent fluid leakage around the outside of sleeve 27.

An inlet port 33 is formed in body 21 and communicates with section 24 of chamber 22. Port 33 is threaded to receive inlet pipe 13 connected to pump 15. In substantial alignment with port 33, an outlet passage or port 34 also communicates with chamber section 24. Passage 34 is formed with a shoulder 35 which forms a seat for a check valve 36 having a bevelled seating surface 37 and formed with flutes 38 permitting fluid to pass therearound when the check valve is in the open position. A spring 40 engages the upper side of valve 36, normally urging the valve to a closed position. The tension of spring 40 may be adjusted by a nipple 41 threaded in the upper end of port 34, but this spring would normally be installed without adjustment. Nipple 41 is interiorly threaded to receive pipe or conduit 14 connected to receiver 30.

Another outlet port 42 communicates with chamber section 26 and is interiorly threaded to receive one end of pipe 16 connected to reservoir 10. A main control valve 45 is slidably mounted in chamber 22 and is in the form of a spool having a central rod 46 to both ends of which are connected pistons 47 and 48 disposed respectively in chamber 24 and in sleeve 27. Pistons 47 and 48 are equal in area, and are provided with suitable sealing means 50 and 51 preventing fluid leakage past the pistons. Between pistons 47 and 48, a valve member 52 is fixed on rod 46 and is adapted to engage shoulder 23 which forms a valve seat therefor. The seating area of valve member 52 is equal to the areas of pistons 47 and 48. Such arrangement provides for valve 45 to be balanced, with respect to fluid pressure, in any position thereof, which is an important feature of the present invention. A spring 53 engages valve member 52 and the inner end of sleeve 27 to normally urge valve member 52 into engagement with valve seat 23, as shown in Fig. 2. Under such conditions, inlet port 33 is connected to port 34, and if check valve 36 is open, to outlet pipe 14. This is the condition when motor 20 and pump 15 are operating and the pressure in receiver 30 is below the "cut-in" pressure and "cut-out" pressure.

The "cut-in" pressure is adjustable by a member 55 threaded into the upper end of a chamber 56 disposed adjacent outlet passage 34. Member 55 has a spring seating surface engaging the upper end of a spring 57 which is in engagement with the head 58 of a cylindrical plunger 60. Plunger 60 is slidably mounted in a bore 61 which is coaxially aligned with chamber 56, and is provided with a tappet 62 extending through an aperture 63 in the lower end of bore 61. Sealing means 64 and 65 are provided to prevent fluid leakage past plunger 60. Member 55 is vented to atmosphere as at 66.

Aperture 63 connects passage 61 to a chamber 67 in which is mounted a poppet valve 68 normally urged upwardly by a spring 70. Tappet 62 on plunger 60 engages valve 68 for a purpose to be described more fully hereinafter. A passage 71 connects chamber 67 to a passage 72, which latter communicates with chamber section 24 of valve chamber 22. A passage 73 connects aperture 63 to drain pipe 17 which, as previously explained, is connected to receiver 10.

At its opposite end, passage 72 communicates with a valve chamber 75 in which is mounted a conical valve 76 provided with sealing means 77. Valve 76 controls the "cut-out" pressure of receiver 30, and is normally maintained in engagement with a shoulder or valve seat 78 by a spring 80. Compression of spring 80 is adjusted by a threaded member 81 in the outer end of chamber 75, vented to atmosphere through a passage 82. Member 81 is effective to adjust the "cut-out" pressure through adjustment of the compression of spring 80. A port 83 connects outlet port 34 to chamber 56 below plunger head 58, and a port 84 connects chamber 56 to chamber 75.

Valve 25 operates in the following manner. When the pressure of fluid delivered by pump 15 through pipe 13 to inlet port 33 is less than the "cut-in" value, which may be for instance 1250 pounds, check valve 36 lifts from its seat permitting the fluid to pass therearound through flutes 38 into outlet pipe 14, which delivers the fluid to receiver 30. As the seating area of valve member 52 of control valve 45 is equal to the area of piston 47, the pressure fluid will have no effect on balanced valve 45. Accordingly, spring 53 will maintain valve member 52 in engagement with seat 23. The pressure fluid acts through port 83 on the underside of head 58 to lift plunger 60, thus permitting the spring 70 to close valve 68. This interrupts communication between passage 71 and passage 73.

Pressure fluid continues to pass through valve 25 into receiver 30 until the receiver pressure equals or exceeds the "cut-out" value, which may, for example, be 1500 pounds. When this occurs, valve 76 is forced off its seat, thus connecting chamber section 24 beyond piston 47 to receiver 30 through outlet port 34, port 83, chamber 56, port 84, chamber 75 and passage 72. The receiver pressure now acts behind piston 47 to move valve 45 to the right against the force of spring 53. Valve 45 is balanced in this position due to the equal total pressure on pistons 47 and 48. Valve member 52 thus disengages seat 23 and pipe 13 is connected to pipe 16, through inlet port 33, chamber 22 and outlet port 42. The pressure fluid from pump 15 is returned to reservoir 10 through pipe 16, thus "unloading" the pump. The pressure within receiver 30 remains trapped, due to seating of check valve 36 when valve 45 moves to the right to connect pipe 13 to pipe 16. Check valve 36 allows flow of fluid from the lower to the upper end of passage 34 and thence into receiver 30, but does not permit reverse flow of fluid therefrom.

When the pressure in receiver 30 and the system connected thereto drops, due to operation of a hydraulic mechanism included in the system or to external or internal leakage in the system, valve 76 will reseat under the influence of spring 80. It will be noted that chamber 75 has a greater cross-sectional area than port 84, and that valve 76 is conical. Thus, the body area of valve 76 is greater than the seating area thereof, as the body area is determined by the area of chamber 75 and the seating area by the area of port 84. The ratio of the body area to the seating area of valve 76 is such as to cause this valve to reseat at an intermediate pressure, such as 1300 pounds, for example. Such pressure is well below the "cut-out" pressure but above the "cut-in" pressure. This arrangement maintains the full system pressure of receiver 30 behind piston 47 for as long a period as possible in order to prevent inadvertent seating of valve member 52. Such might happen due to internal leakage past poppet valve 68 or past seal 50 if the system pressure was cut-off from behind piston 47 by inadvertent or intentional closing of valve 76.

When the system pressure of receiver 30 drops below the "cut-in" valve, the force of spring 57, which is adjusted by member 55, becomes greater than the force exerted by the receiver pressure acting under plunger head 58. Plunger 60 thereupon moves downwardly and tappet 62 moves poppet valve 68 off its seat. Pressure fluid trapped beyond piston 47 in chamber section 24 now drains through passage 72, passage 71, chamber 70, aperture 63, passage 73 and pipe 17 back to reservoir 10. Valve 45 will thus be moved to the left under the influence of spring 53, to the position shown in Fig. 2. When valve member 52 engages seat 23, pressure fluid from pipe 13 will again be delivered to outlet port 34. This will lift check valve 38 permitting the pressure fluid to pass to receiver 30. At the same time, the pressure will raise plunger 60, in the manner previously described, permitting valve 68 to be seated by spring 70.

Downward movement of plunger 60 is limited by engagement of the lower end thereof with the bottom of bore 61. The length of tappet 62 is such as to cause valve 68 to be open only slightly when plunger 60 is in its lowermost position. Valve 68 thus impedes the flow of fluid from chamber section 24 to pipe 17, and thus limits the speed with which spring 53 can act to seat valve member 52. This prevents valve member 52 from striking violently against seat 23 and damaging either the valve member or the seat.

As pistons 47 and 48 are equal in area and likewise equal to the seating area of valve member 52, valve 45 is balanced in either of its two positions. When valve 45 is in the position shown in Fig. 2, the pressures acting on piston 47 and valve member 52 are equal by reason of the equal area of these parts. Similarly, when valve member 45 moves to the right to connect pipe 13 to pipe 16, the total pressures acting on pistons 47 and 48 by reason of the pressure fluid passing through chamber 22, are equal by virtue of the equal areas of pistons 47 and 48. Thus valve 45 is balanced in the latter position also, and its operation is therefore in no way affected by back pressure in the system. The routing of pipe 17 directly back to the reservoir eliminates all other possibilities of back pressure affecting the valve operation since there will be no appreciable back pressure in this line.

The described valve provides a simple and effective mechanism for controlling the charging of a fluid pressure receiver from a source of fluid pressure. The mechanism of the valve assembly prevents any accidental seating of main control valve 45 until such time as the receiver pressure has dropped to its "cut-in" value, despite any slight leakage past poppet valve 68. Additionally, poppet valve 68 restricts the discharge of pressure fluid from chamber section 24 to thus limit the rate of movement of valve member 52 to the left. This prevents damage either to the valve member or to seat 23. As valve 76 has a body area greater than its seated area, effective control of the intermediate pressure at which valve 76 will seat is achieved, whereby the valve will seat on a pressure which is well above the "cut-in" pressure but below the "cut-out" pressure. The entire valve, furthermore, is simple in construction and reliable in operation.

While a specific embodiment of the invention has been shown and described to illustrate the application of the principles thereof, the invention may be otherwise embodied without departing from such principles.

What is claimed is:

1. A valve assembly comprising, in combination, a valve body having an inlet port arranged to be connected to a source of fluid under pressure, a first outlet port arranged to be connected to a receiver of fluid under pressure and a second outlet port arranged to be connected to a fluid reservoir under substantially atmospheric pressure; a balanced valve controlling communication between said inlet port and said outlet ports; means normally maintaining said balanced valve in a first position establishing communication between said inlet port and said first outlet port; a check valve disposed between said balanced valve and said first outlet port and operable to prevent reverse flow of fluid from said receiver to such source; a device operable when the pressure in said receiver exceeds a preselected value to apply pressure fluid from said receiver to one side of said balanced valve to move the latter to a second position establishing communication between said inlet port and said second outlet port; a pressure responsive element operable when the pressure in said receiver drops a predetermined amount below said preselected value to connect said one side of said valve to said fluid reservoir through a third outlet port, said means thereupon moving said balanced valve to said first position; and mechanism restricting the rate of movement of said balanced valve from said second position to said first position.

2. A valve assembly comprising, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under substantially atmospheric pressure; a balanced valve slidably mounted in said chamber and including a valve member adapted to engage said valve seat; means normally maintaining said valve member in engagement with said seat; a check valve disposed between said balanced valve and said first outlet port and operable to prevent reverse flow of fluid from said receiver to such source; a device operable when the pressure in said receiver exceeds a preselected value to apply pressure fluid from said receiver to one side of said balanced valve to move said valve member away from said valve seat to establish communication between said inlet port and said second outlet port; a pressure responsive element operable when the pressure in said receiver drops a predetermined amount below said preselected value to connect said one side of said valve to said fluid reservoir, said means thereupon moving said valve member into engagement with said seat; and mechanism restricting the rate of movement of said valve member into engagement with said seat.

3. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging one of said pistons and normally urging said valve member into engagement with said seat; a check valve disposed between said balanced valve and said first outlet port and operable to prevent reverse flow of fluid from said receiver to such source; a device operable when the pressure in said receiver exceeds a preselected value to apply pressure fluid from said receiver to said first chamber section beyond the other piston to move said valve member away from said valve seat to establish communication between said inlet port and said second outlet port; a pressure responsive element operable when the pressure in said receiver drops a predetermined amount below said preselected value to connect said first chamber section beyond said other piston to said fluid reservoir, said means thereupon moving said valve member into engagement with said seat; and mechanism including said element restricting the rate of movement of said valve member into engagement with said seat.

4. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a valve member adapted to engage said valve seat; means engaging one end of said balanced valve and normally urging said valve member into engagement with said seat; a check valve disposed between said balanced valve and said first outlet port and operable to prevent reverse flow of fluid from said receiver to said source; a device operable when the pressure in said receiver exceeds a preselected value to apply pressure fluid from said receiver to the opposite end of said balanced valve to move said valve member away from said valve seat to establish communication between said inlet port and said second outlet port; said valve body being formed with a passage connecting the opposite end of said balanced valve to said fluid reservoir; a spring closed valve controlling said passage; a pressure responsive element operable when the pressure in said receiver drops a predetermined amount below said preselected value to open said spring closed valve, said means thereupon moving said valve member into engagement with said seat; and mechanism including said element restricting the rate of movement of said valve member into engagement with said seat.

5. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a valve member adapted to engage said valve seat; means engaging one end of said balanced valve and normally urging said valve member into engagement with said seat; a check valve disposed between said balanced valve and said first outlet port and operable to prevent reverse flow of fluid from said receiver to said source; said valve body being formed with a passage connecting the opposite end of said balanced valve to said first outlet port; a spring closed valve controlling said passage; said spring closed valve being operable when the pressure in said receiver exceeds a preselected value to establish communication between said opposite end of said balanced valve and said first outlet port to move said valve member away from said valve seat to establish communication between said inlet port and said second outlet port; a pressure responsive element operable when the pressure in said receiver drops a predetermined amount below said preselected value to connect the opposite end of said balanced valve to said fluid reservoir, said means thereupon moving said valve member into engagement with said seat; and mechanism restricting the rate of movement of said valve member into engagement with said seat.

6. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a valve member adapted to engage said valve seat; means engaging one end of said balanced valve and normally urging said valve member into engagement with said seat; a check valve disposed between said balanced valve and said first outlet port and operable to prevent reverse flow of fluid from said receiver to said source; said valve body being formed wiht a first passage connecting the opposite end of said balanced valve to said fluid reservoir and with a second passage connecting the opposite end of said balanced valve to said first outlet port; a first spring closed valve controlling said first passage; a second spring closed valve controlling said second passage; said second spring closed valve being operable, when the pressure in said receiver exceeds a preselected value to establish communication between said opposite end of said balanced valve and said first outlet port to move said valve member away from said valve seat to establish communication between said inlet port and said second outlet port; a pressure responsive element operable when the pressure in said receiver drops a predetermined amount below said preselected value to open said first spring closed valve, said means thereupon moving said valve member into engagement with said seat; and mechanism including said first spring closed valve restricting the rate of movement of said valve member into engagement with said seat.

7. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; a device operable when the pressure in said receiver exceeds a preselected value to apply pressure fluid from said receiver to the outer side of the other piston to move said valve member away from said valve seat to establish communication between said inlet port and said second outlet port; said valve body being formed with a passage connecting the outer side of said other piston to said fluid reservoir; a spring closed valve controlling said passage; a pressure responsive element operable when the pressure in said receiver drops a predetermined amount below said preselected value to open said spring closed valve, said means thereupon moving said valve member into engagement with said seat; and mechanism restricting the rate of movement of said valve member into engagement with said seat.

8. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; said valve body being formed with a passage connecting the outer side of said other piston to said first outlet port; a spring closed valve controlling said passage; said spring closed valve being operable, when the pressure in said receiver exceeds a preselected value to establish communication between said outer side of said other piston and said first outlet port to move said valve member away from said valve seat to establish communication between said inlet port and said second outlet port; a pressure responsive element operable when the pressure in said receiver drops a predetermined amount below said preselected value to connect the outer side of said other piston to atmosphere, said means thereupon moving said valve member into engagement with said seat; and mechanism restricting the rate of movement of said valve member into engagement with said seat.

9. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; said valve body being formed with a first passage connecting the outer side of said other piston to said fluid reservoir and with a second passage connecting the outer side of said other piston to said first outlet port; a first spring closed valve controlling said first passage; a second spring closed valve controlling said second passage; said second spring closed valve being operable, when the pressure in said receiver exceeds a preselected value to establish communication between said opposite end of said balanced valve and said first outlet port to move said valve member away from said seat to establish communication between said inlet port and said second outlet port; a pressure responsive element operable when the pressure in said receiver drops a predetermined amount below said preselected value to open said first spring closed valve, said means thereupon moving said valve member into engagement with said seat; and mechanism including said first spring closed valve restricting the rate of movement of said valve member into engagement with said seat.

10. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a valve member adapted to engage said valve seat; means engaging one end of said balanced valve and normally urging said valve member into engagement with said seat; a check valve disposed between said balanced valve and said first outlet port and operable to prevent reverse flow of fluid from said receiver to said source; said valve body being formed with a passage connecting the opposite end of said balanced valve to said first outlet port, said passage having a shoulder therein forming a valve seat; a second valve disposed in said passage; a spring normally urging said second valve into engagement with said shoulder to close said passage; said second valve being operable, when the pressure in said receiver exceeds a preselected value to establish communication between said opposite end of said balanced valve and said first outlet port to move said valve member away from said valve seat to establish communication between said inlet port and said second outlet port; said second valve, when closed, having a seating area exposed to the pressure of said receiver and, when open, having a body area exposed to the pressure of said receiver, and said body area being greater than said seating area whereby said second valve will close at a lower pressure than the pressure required to open the same; a pressure responsive element operable when the pressure in said receiver drops a predetermined amount below said preselected value to connect the opposite end of said balanced valve to said fluid reservoir, said means thereupon moving said valve member into engagement with said seat; and mechanism restricting the rate of movement of said valve member into engagement with said seat.

11. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a valve member adapted to engage said valve seat; means engaging one end of said balanced valve and normally urging said valve member into engagement with said seat; a check valve disposed between said balanced valve and said first outlet port and operable to prevent reverse flow of fluid from said receiver to said source; said valve body being formed with a first passage connecting the opposite end of said balanced valve to said fluid reservoir and with a second passage connecting the opposite end of said balanced valve to said first outlet port; said second passage having a shoulder therein forming a valve seat; a first spring closed valve controlling said passage; a second valve disposed in said second passage; a spring normally urging said second valve into engagement with said shoulder to close said second passage; said second valve being operable, when the pressure in said receiver exceeds a preselected value to establish communication between said opposite end of said balanced valve and said first outlet port to move said valve member away from said valve seat to establish communication between said inlet port and said second outlet port; said second valve, when closed, having a seating area exposed to the pressure of said receiver and, when open, having a body area exposed to the pressure of said receiver, and said body area being greater than said seating area whereby said second valve will close at a lower pressure; a pressure responsive element operable when the pressure in said receiver drops a predetermined amount below said preselected value to open said first spring closed valve, said means thereupon moving said valve member into engagement with said seat; and mechanism including said first spring closed valve restricting the rate of movement of said valve member into engagement with said seat.

12. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; said valve body being formed with a passage connecting the outer side of said other piston to said first outlet port, said passage having a shoulder therein forming a valve seat; a second valve disposed in said passage; a spring normally urging said second valve into engagement with said shoulder to close said passage; said second valve being operable, when the pressure in said receiver exceeds a preselected value to establish communication between said outer side of said other piston and said first outlet port to move said valve member away from said valve seat to establish communication between said inlet port and said second outlet port; said second valve, when closed, having a seating area exposed to the pressure of said receiver and, when open, having a body area exposed to the pressure of said receiver, and said body area being greater than said seating area whereby said second valve will close at a lower pressure than the pressure required to open the same; a pressure responsive element operable when the pressure in said receiver drops a predetermined amount below said preselected value to open said first spring closed valve; said means thereupon moving said valve member into engagement with said seat; and mechanism restricting the rate of movement of said valve member into engagement with said seat.

13. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source;

said valve body being formed with a first passage connecting the outer side of said other piston to said fluid reservoir and with a second passage connecting the outer side of said other piston to said first outlet port, said second passage having a shoulder therein forming a valve seat; a first spring closed valve controlling said first passage; a second valve disposed in said second passage; a spring normally urging said second valve into engagement with said shoulder to close said second passage; said second valve being operable, when the pressure in said receiver exceeds a preselected value to establish communication between said outer side of said other piston and said first outlet port to move said valve member away from said valve seat to establish communication between said inlet port and said second outlet port; said second valve, when closed, having a seating area exposed to the pressure of said receiver and, when open, having a body area exposed to the pressure of said receiver, and said body area being greater than said seating area whereby said second valve will close at a lower pressure than the pressure required to open the same; a pressure responsive element operable when the pressure in said receiver drops a predetermined amount below said preselected value to open said first spring closed valve, said means thereupon moving said valve member into engagement with said seat; and mechanism including said first spring closed valve restricting the rate of movement of said valve member into engagement with said seat.

14. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a valve member adapted to engage said valve seat; means engaging one end of said balanced valve and normally urging said valve member into engagement with said seat; a check valve disposed between said balanced valve and said first outlet port and operable to prevent reverse flow of fluid from said receiver to said source; a device operable when the pressure in said receiver exceeds a preselected value to apply pressure fluid from said receiver to the opposite end of said balanced valve to move said valve member away from said valve seat to establish communication between said inlet port and said second outlet port; said valve body being formed with a passage connecting the opposite end of said balanced valve to said fluid reservoir, said passage having a shoulder therein forming a valve seat; a second valve disposed in said passage; a spring normally urging said second valve into engagement with said shoulder to close said passage; a plunger slidably mounted in said body and having an end engaging said second valve; said plunger moving away from said second valve when the pressure in said receiver exceeds said preselected value; resilient means normally urging said plunger in a direction to open said second valve when the pressure in the receiver drops a predetermined amount below said preselected value; said first-named means thereupon moving said valve member into engagement with said seat; and abutment means limiting the movement of said plunger toward said second valve to restrict the amount of opening of said second valve and thus restrict the rate of movement of said valve member into engagement with said seat.

15. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; a device operable when the pressure in said receiver exceeds a preselected value to apply pressure fluid from said receiver to the outer side of the other piston to move said valve member away from said valve seat to establish communication between said inlet port and said second outlet port; said valve body being formed with a passage connecting the outer side of said other piston to said fluid reservoir, said passage having a shoulder therein forming a valve seat; a second valve disposed in said passage; a spring normally urging said second valve into engagement with said shoulder to close said passage; a plunger slidably mounted in said body and having an end engaging said second valve, said plunger moving away from said second valve when the pressure in said receiver exceeds said preselected value; resilient means normally urging said plunger in a direction to open said second valve when the pressure in the receiver drops to an intermediate value below said preselected value; said first-named means thereupon moving said valve member into engagement with said seat; and abutment means limiting the movement of said plunger toward said second valve to restrict the amount of opening of said second valve and thus restrict the rate of movement of said valve member into engagement with said seat.

16. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; a device operable when the pressure in said receiver exceeds a preselected value to apply pressure fluid from said receiver to the outer side of the other piston to move said valve member away from said valve seat to establish communication between said inlet port and said second outlet port; said valve body being formed with a passage connecting the outer side of said other piston to said fluid reservoir, said passage having a shoulder therein forming a valve seat; a second valve disposed in said passage; a spring normally urging said second valve into engagement with said shoulder to close said passage; a plunger slidably mounted in said body and having an end engaging said second valve, said plunger moving away from said second valve when the pressure in said receiver exceeds said preselected value; resilient means normally urging said plunger in a direction to open said second valve when the pressure in the receiver drops to an intermediate value below said preselected value; said first-named means thereupon moving said valve member into engagement with said seat; abutment means limiting the movement of said plunger toward said second valve to restrict the amount of opening of said second valve and thus restrict the rate of movement of said valve member into engagement with said seat; and adjusting means operatively associated with said resilient means to adjust said intermediate value of pressure in said receiver.

17. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; a device operable when the pressure in said receiver exceeds a preselected value to apply pressure fluid from said receiver to the outer side of the other piston to move said valve member away from said valve seat to establish communication between said inlet port and said second outlet port; said valve body being formed with a passage connecting the outer side of said other piston to said fluid reservoir, said passage having a shoulder therein forming a valve seat; a second valve disposed in said passage; a spring normally urging said second valve into engagement with said shoulder to close said passage; a plunger slidably mounted in said body and having an end engaging said second valve, said plunger moving away from said second valve when the pressure in said receiver exceeds said preselected value; resilient means normally urging said plunger in a direction to open said second valve when the pressure in the receiver drops to an intermediate value below said preselected value; said first-named means thereupon moving said valve member into engagement with said seat; and abutment means limiting the movement of said plunger toward said second valve to restrict the amount of opening of said second valve and thus restrict the rate of movement of said valve member into engagement with said seat; the seating area of said valve member being equal to the area of each of said pistons whereby said balanced valve is balanced in either position.

18. A valve assembly including, in combination, a valve body having a valve chamber formed with a first and second section and a valve seat between said sections, an inlet port communicating with said first section and arranged to be connected to a source of fluid under pressure, a first outlet port communicating with said first section and arranged to be connected to a receiver of fluid under pressure and a second outlet port communicating with said second section and arranged to be connected to a fluid reservoir under atmospheric or slightly higher than atmospheric pressure; a balanced valve slidably mounted in said chamber and including a pair of substantially equal area interconnected pistons disposed respectively in said first and second chamber sections and a valve member disposed between and interconnected to said pistons and adapted to engage said valve seat; means engaging the outer side of one of said pistons and normally urging said valve member into engagement with said seat; a check valve disposed between said balanced valve and said first outlet port and operable to prevent reverse flow of fluid from said receiver to said source; a device operable when the pressure in said receiver exceeds a preselected value to apply pressure fluid from said receiver to the outer side of the other piston to move said valve member away from said valve seat to establish communication between said inlet port and said second outlet port; said valve body being formed with a passage connecting the outer side of said other piston to said fluid reservoir, said passage having a shoulder therein forming a valve seat; a second valve disposed in said passage; a spring normally urging said second valve into engagement with said shoulder to close said passage; a plunger slidably mounted in said body and having an end engaging said second valve, said plunger moving away from said second valve when the pressure in said receiver exceeds said preselected value; resilient means normally urging said plunger in a direction to open said second valve when the pressure in the receiver drops to an intermediate value below said preselected value; said first-named means thereupon moving said valve member into engagement with said seat; abutment means limiting the movement of said plunger toward said second valve to restrict the amount of opening of said second valve and thus restrict the rate of movement of said valve member into engagement with said seat; and adjusting means operatively associated with said resilient means to adjust said intermediate value of pressure in said receiver; the seating area of said valve member being equal to the area of each of said pistons whereby said balanced valve is balanced in either position.

19. A valve assembly comprising, in combination, a valve body having an inlet port arranged to be connected to a source of fluid under pressure, a first outlet port arranged to be connected to a receiver of fluid under pressure and a second outlet port arranged to be connected to a fluid reservoir under substantially atmospheric pressure; a balanced valve controlling communication between said inlet port and said outlet ports; means normally maintaining said balanced valve in a first position establishing communication between said inlet port and said first outlet port; a check valve disposed between said balanced valve and said first outlet port and operable to prevent reverse flow of fluid from said receiver to such source; a device operable when the pressure in said receiver exceeds a preselected value to apply pressure fluid from said receiver to one side of said balanced valve to move the latter to a second position establishing communication between said inlet port and said second outlet port; and a pressure responsive element operable when the pressure in said receiver drops a predetermined amount below said preselected value to connect said one side of said valve to said fluid reservoir through a third outlet port, said means thereupon moving said balanced valve to said first position.

20. A valve assembly comprising a valve body having an inlet port connectible to a source of fluid under pressure, a first outlet port connectible to a receiver of fluid under pressure and a second outlet port connectible to a reservoir of fluid under substantially atmospheric pressure; valve means controlling communication between said inlet port and said outlet ports and normally biased to a first position establishing communication between said inlet port and said first outlet port; and a pair of independently operable pilot valves conjointly controlling the operation of such valve means; one of said valves being operable when the pressure in the receiver exceeds a preselected value to apply fluid under pressure to said valve means to effect movement thereof to a second position connecting said inlet port to said second outlet port, and the other valve being operable when the pressure in the receiver drops a predetermined amount below said preselected value to exhaust such pressure fluid from said valve means to effect return thereof to said first position.

DAVID GRANT.